United States Patent
Yu et al.

(10) Patent No.: US 8,153,302 B2
(45) Date of Patent: Apr. 10, 2012

(54) METHOD OF PRODUCING ACTIVE MATERIAL FOR LITHIUM SECONDARY BATTERY, METHOD OF PRODUCING ELECTRODE FOR LITHIUM SECONDARY BATTERY, METHOD OF PRODUCING LITHIUM SECONDARY BATTERY, AND METHOD OF MONITORING QUALITY OF ACTIVE MATERIAL FOR LITHIUM SECONDARY BATTERY

(75) Inventors: Denis Yau Wai Yu, Moriguchi (JP);
Kazunori Donoue, Moriguchi (JP);
Toshikazu Yoshida, Moriguchi (JP);
Tetsuo Kadohata, Moriguchi (JP);
Tetsuyuki Murata, Moriguchi (JP);
Shigeki Matsuta, Moriguchi (JP)

(73) Assignee: Sanyo Electric Co., Ltd., Osaka (JP)

( * ) Notice: Subject to any disclaimer, the term of this patent is extended or adjusted under 35 U.S.C. 154(b) by 1079 days.

(21) Appl. No.: 12/071,880

(22) Filed: Feb. 27, 2008

(65) Prior Publication Data
US 2008/0222881 A1    Sep. 18, 2008

(30) Foreign Application Priority Data

| Feb. 28, 2007 | (JP) | ................... | 2007-050586 |
| May 22, 2007 | (JP) | ................... | 2007-136050 |
| Jul. 5, 2007 | (JP) | ................... | 2007-177742 |
| Jan. 17, 2008 | (JP) | ................... | 2008-008288 |

(51) Int. Cl.
*H01M 4/04* (2006.01)
(52) U.S. Cl. .................. 429/231.3; 429/231.1
(58) Field of Classification Search ............... 429/231.1, 429/231.3
See application file for complete search history.

(56) References Cited

U.S. PATENT DOCUMENTS

| 2002/0106562 A1 | 8/2002 | Sato et al. ................ 429/221 |
| 2007/0117013 A1 | 5/2007 | Hosoya et al. ............. 429/221 |

FOREIGN PATENT DOCUMENTS

| JP | 2002-110162 A | 4/2002 |
| JP | 2002-117847 A | 4/2002 |
| JP | 2003-17054 A | 1/2003 |
| JP | 3484003 B2 | 10/2003 |
| WO | 2005/051840 A1 | 6/2005 |

*Primary Examiner* — Stuart Hendrickson
(74) *Attorney, Agent, or Firm* — Kubovcik & Kubovcik (57) ABSTRACT

A method of producing an active material for a lithium secondary battery, by which impurities causing problems in synthesizing an active material for a lithium secondary battery, including a lithium transition metal oxyanion compound are removed efficiently and enhancement of an energy density is realized, is provided. By cleaning the active material for a lithium secondary battery, including a lithium transition metal oxyanion compound, with a pH buffer solution, for example, it is possible to efficiently remove just only impurities such as $Li_3PO_4$ or $Li_2CO_3$, or a substance, other than $LiFePO_4$, in which the valence of Fe is bivalent such as $FeSO_4$, FeO or $Fe_3(PO_4)_2$ without dissolving Fe of $LiFePO_4$.

19 Claims, 3 Drawing Sheets

METHOD OF PRODUCING ACTIVE MATERIAL FOR LITHIUM SECONDARY BATTERY, METHOD OF PRODUCING ELECTRODE FOR LITHIUM SECONDARY BATTERY, METHOD OF PRODUCING LITHIUM SECONDARY BATTERY, AND METHOD OF MONITORING QUALITY OF ACTIVE MATERIAL FOR LITHIUM SECONDARY BATTERY

BACKGROUND OF THE INVENTION

1. Field of the Invention

The present invention relates to a method of producing an active material used for a lithium secondary battery, a method of producing an electrode for a lithium secondary battery, a method of producing a lithium secondary battery, and a method of monitoring a quality of an active material for a lithium secondary battery, and is particularly characterized in that, by cleaning an active material including a lithium transition metal oxyanion compound with a pH buffer solution, the amounts of impurities in the active material is reduced, and higher quality and enhancement of an energy density are realized.

2. Description of the Related Art

With respect to a nonaqueous electrolyte secondary battery, generally at present, $LiCoO_2$ is used for a positive electrode, and a lithium metal, a lithium alloy, or a carbon material capable of storing and releasing lithium is used for a negative electrode, and an electrolyte made of lithium salt such as $LiBF_4$ or $LiPF_6$ is used as a nonaqueous electrolyte solution by dissolving in an organic solvent such as ethylene carbonate or diethyl carbonate. However, when $LiCoO_2$ is used for a positive electrode, a production cost becomes high since the reserves of metal Co is limited and metal Co is rare resources. Further, a battery using $LiCoO_2$ has a problem that a battery in a charge state is very low in heat stability at elevated temperatures compared with that in a normal usage state. Therefore, use of $LiMn_2O_4$ or $LiNiO_2$ is investigated as a positive electrode material instead of $LiCoO_2$, but $LiMn_2O_4$ is not expected to have a sufficient discharge capacity and further has a problem that manganese is dissolved when a battery temperature is elevated. On the other hand, $LiNiO_2$ has problems that a discharge voltage becomes low etc.

In recent years, olivine type lithium phosphate such as $LiFePO_4$ attracts attention as a positive electrode material instead of $LiCoO_2$. Olivine type lithium phosphate is a lithium complex compound expressed by the general formula $LiMPO_4$, wherein M represents at least one element selected from Co, Ni, Mn, and Fe, and its working voltage varies depending on a species of a core metal element M. And, the lithium complex compound has advantages that a battery voltage can be freely selected depending on the selection of an element M and a battery capacity per unit weight can be increased since a theoretical capacity is as relatively high as about 140 to 170 mAh/g. Furthermore, it is possible to select iron as M in the general formula. Since iron has a large output and is inexpensive, iron has an advantage that a production cost can be significantly reduced by use itself, and it is suitable for a positive electrode material of a large-scale battery or a high-power battery.

As a synthetic method of $LiFePO_4$, various synthetic methods such as a solid-phase process, a hydrothermal process and a coprecipitation process are proposed. In Patent Publication No. 3484003, a reaction of $Li_2CO_3 + 2FeC_2O_4 \cdot 2H_2O + 2(NH_4)_2HPO_4 \rightarrow 2LiFePO_4 + 4NH_3 + 5CO_2 + 5H_2O + 2H_2$ is used to synthesize $LiFePO_4$ in a solid-phase process. And, in Japanese Patent Laid-Open No. 2002-110162, a reaction of $Li_3PO_4 + Fe_3(PO_4)_2 \cdot nH_2O \rightarrow 3LiFePO_4 + nH_2O$ is used to synthesize $LiFePO_4$ in a solid-phase process.

However, in these synthetic methods, when mixing is insufficient or a reaction is not homogeneous, $Li_2CO_3$ or $Li_3PO_4$ of a raw material remains unreacted and remains as an impurities in an active material.

Since such impurities do not contribute to a charge-discharge reaction, this causes a battery capacity to decrease and further causes internal short-circuit. And, there is a problem that when the amounts of impurities contained in $LiFePO_4$ varies from production lot to production lot, the capacity of a battery prepared by use of this $LiFePO_4$ varies. Furthermore, there are problems that when an impurities exhibits alkalinity, since it reacts with polyvinylidene difluoride (PVdF) which is generally often used as a binder in preparing an electrode, a slurry property in preparing a positive electrode plate is deteriorated to make it difficult to prepare the electrode and electrode strength becomes insufficient.

As a means for eliminating the impurities in lithium complex oxides, cleaning of lithium complex oxide with water is proposed in Japanese Patent Laid-Open No. 2003-17054. As a means for eliminating the impurities in $LiFePO_4$, a method, in which a reaction of $FeSO_4 \cdot 7H_2O + H_3PO_4 + 3LiOH \cdot H_2O \rightarrow LiFePO_4 + Li_2SO_4 + 11H_2O$ is used to mix a raw material, and $LiFePO_4$ is synthesized by a hydrothermal process and then cleaned with distilled water to produce $LiFePO_4$, is proposed in International Publication WO 2005/051840A1 pamphlet.

For a problem that the amounts of impurities contained in $LiFePO_4$ varies from production lot to production lot, a method of monitoring the conductivity of distilled water used in cleaning is proposed in International Publication WO 2005/051840A1 pamphlet, and a method of quantifying the amounts of impurities by a X-ray diffraction method is proposed in Japanese Patent Laid-Open No. 2002-117847.

SUMMARY OF THE INVENTION

However, the cleaning with water proposed in Japanese Patent Laid-Open No. 2003-17054 has a problem that a large quantity of lithium ions dissolves in water from an active material. Further, the cleaning with distilled water proposed in International Publication WO 2005/051840A1 pamphlet has a problem that water-insoluble impurities such as $Li_3PO_4$ and $Li_2CO_3$ cannot be eliminated even by cleaning.

Further, methods of quantifying the amounts of impurities proposed in International Publication WO 2005/051840A1 pamphlet and Japanese Patent Laid-Open No. 2002-117847 are low in sensitivity and precision, and a problem that the amounts of impurities contained in $LiFePO_4$ vary from production lot to production lot is not resolved well.

An object of the present invention is to provide a method of producing an active material for a lithium secondary battery which solves the above-mentioned problems and enhances an energy density thereof, a method of producing an electrode for a lithium secondary battery using the method of producing the active material for a lithium secondary battery, and a lithium secondary battery produced by using the method of producing the electrode for a lithium secondary battery.

A first invention of the present application relates to a method of producing an active material for a lithium secondary battery, including a lithium transition metal oxyanion compound, wherein said active material is cleaned with a pH buffer solution.

According to the above-mentioned method, it is possible to remove just only impurities, which are raw materials or by-products, such as $Li_3PO_4$, $Li_2CO_3$, or the bivalent Fe compounds such as $FeSO_4$, FeO, or $Fe_3(PO_4)_2$, other than $LiFePO_4$, without dissolving Fe of $LiFePO_4$, by using a pH buffer solution as a cleaning solution, after synthesizing LiFePO$_4$, for example. Therefore, an active material for a lithium secondary battery, in which an energy density is enhanced, can be obtained. Further, it is possible to suppress voltage depression resulting from dissolving a Fe compound contained as an impurity in a positive electrode in a battery and moving the Fe compound to a negative electrode, and to suppress reduction in charge-discharge efficiency and voltage depression due to the deposition of Li. Furthermore, by suppressing the deposition of Li, charge retention characteristics can be improved. Further, impurities exhibiting alkalinity can be removed so that a reaction between the impurities and a binder of PVdF can be suppressed, thereby to improve a slurry property and to make the preparation of an electrode easier and obtain sufficient electrode strength.

The pH buffer solution used for the above-mentioned cleaning is preferably in the range from pH 4.0 to pH 8.5. By using a cleaning solution in this pH range, LiFePO$_4$ is hardly dissolved and only impurities can be removed more efficiently.

On the other hand, when the active material is cleaned with a cleaning solution having a pH value of less than 4.0, a cleaning effect of eliminating Li$_3$PO$_4$ is large due to the high dissolubility of Li$_3$PO$_4$, but Fe in LiFePO$_4$ may be dissolved in the cleaning solution which is an acid solution to reduce a discharge capacity. When the active material is cleaned with a cleaning solution having a pH value of more than 8.5, a cleaning effect is not sufficiently achieved due to the low dissolubility of Li$_3$PO$_4$ to the cleaning solution, and LiFePO$_4$ may be decomposed to reduce a discharge capacity.

The pH buffer solution used for the above-mentioned cleaning as a cleaning solution further is preferably in the range from pH 5.3 to pH 8.1, and preferably, it is further preferably in the range from pH 5.9 to pH 6.9. In these pH ranges, LiFePO$_4$ is stable in the aqueous solution and Li$_3$PO$_4$ is easy to dissolve to be removed more efficiently as an impurity.

Since the pH buffer solution is used as a cleaning solution, a pH value of the cleaning solution does not widely change even if impurities dissolve in the cleaning solution, and therefore it is not necessary to frequently adjust the pH value of the cleaning solution.

In the present invention, a mixed solution of a weak acid and a strong alkali, a mixed solution of a weak alkali and a strong acid, and a mixed solution of a weak acid and a weak alkali can be preferably used as a cleaning solution. Examples of constituents of the pH buffer solution usable for the present invention are shown in Table 1.

TABLE 1

| Weak Acid | Weak Alkali |
|---|---|
| H$_3$BO$_3$ | Ammonia |
| H$_2$CO$_3$ | Tris (hydroxymethyl) aminomethane |
| HF | |
| H$_3$PO$_4$ | |
| H$_2$S | |
| L-ascorbic Acid | |
| Acetic Acid | |
| Oxalic Acid | |
| Citric Acid | |
| Strong Acid | Strong Alkali |
| HBr | NaOH |
| HCl | KOH |
| HI | |
| H$_2$SO$_3$ | |
| H$_2$SO$_4$ | |
| HNO$_3$ | |

A pH buffer solution can be prepared from a combination of a weak acid and its conjugate base such as a combination of acetic acid and sodium acetate and a combination of phosphoric acid and sodium phosphate, and a combination of a weak base and its conjugate acid such as a combination of ammonia water and ammonium chloride, in addition to compounds shown in Table 1.

An aqueous solution of potassium dihydrogenphosphate (KH$_2$PO$_4$), disodium hydrogenphosphate (Na$_2$HPO$_4$) or the like can be used in order to prepare, for example, a pH buffer solution being in the range from pH 4.0 to pH 8.5.

Examples of the lithium transition metal oxyanion compound in the present invention include lithium complex compounds expressed by the general formula LiMPO$_4$ being olivine type lithium phosphate, wherein M represents at least one element selected from Co, Ni, Mn, and Fe. As the element M, Fe is preferably contained as a main component of M, and the complex compound in which a part of M is replaced with Mn, Co, or Ni is preferably employed. Examples of typical compounds include LiFePO$_4$ in which most of M is Fe.

A method of producing an electrode for a lithium secondary battery of the present invention comprises the step of producing an active material according to the above-mentioned methods of producing an active material of the present invention.

The active material prepared by the above-mentioned production method is further processed to be used in an electrode for a lithium secondary battery.

A method of producing a lithium secondary battery of the present invention comprises the step of producing a lithium secondary battery by combining a negative electrode and a nonaqueous electrolyte with a positive electrode produced according to the production method of the present invention.

A lithium secondary battery, in which the active material prepared by the production method of the present invention is used as a positive electrode, has a higher energy density than the energy density of a lithium secondary battery prepared by other production methods.

The negative electrode in the present invention is not particularly limited, and the negative electrode may be made of substance which can be used for a nonaqueous electrolyte secondary battery. Examples of the negative active material include a carbon material capable of storing/releasing lithium, metals and alloys such as Si and Sn, which can store lithium by being alloyed with lithium, and a lithium metal.

A solvent of the nonaqueous electrolyte used in the lithium secondary battery of the present invention is not particularly limited, and mixed solvents of cyclic carbonate such as ethylene carbonate, propylene carbonate, butylene carbonate or vinylene carbonate and chain carbonate such as dimethyl carbonate, methyl ethyl carbonate or diethyl carbonate are exemplified. Further, mixed solvents of the above-mentioned cyclic carbonate and an ether solvent such as 1,2-dimethoxyethane or 1,2-diethoxyethane are exemplified. And, as a solute of the nonaqueous electrolyte, LiXF$_y$ (wherein, X represents an element P, As, Sb, B, Bi, Al, Ga, or In, and when X is P, As or Sb, y is an integer of 6, and when X is Bi, Al, Ga, or In, y is an integer of 4), Li[PF$_3$(C$_2$F$_5$)$_3$], Li[PF$_3$(CF$_3$)$_3$], Li[BF$_2$(CF$_3$)$_2$], Li[BF$_2$(C$_2$F$_5$)$_2$], Li[BF$_3$(CF$_3$)], Li[BF$_3$(C$_2$F$_5$)], lithium(perfluoroalkylsulfonyl)imide LiN(C$_m$F$_{2m+1}$SO$_2$)(C$_n$F$_{2n+1}$SO$_2$) (wherein, m and n are independently an integer of 1 to 4), lithium(perfluoroalkylsulfonyl)methide LiN(C$_p$F$_{2p+1}$SO$_2$)(C$_q$F$_{2q+1}$SO$_2$)(C$_r$F$_{2r+1}$SO$_2$) (wherein, p, q and r are independently an integer of 1 to 4), LiCF$_3$SO$_3$, LiClO$_4$, Li[B(COOCOO)$_2$] and mixtures thereof are exemplified. Furthermore, as an electrolyte, gel-polymer electrolytes formed by impregnating a polymer electrolyte of polyethyleneoxide or polyacrylonitrile with an electrolyte solution, and inorganic solid electrolytes such as LiI and Li$_3$N are exemplified. An electrolyte of the lithium secondary battery of the present invention can be used without limitation as long as a lithium compound as a solute which exerts ionic conductivity and a solvent to dissolve and retain the lithium compound are not decomposed due to a voltage in charging or discharging a battery, or during storing a battery.

A second invention of the present application relates to a method of monitoring the quality of an active material for a lithium secondary battery, including a lithium transition metal oxyanion compound, wherein the quality of the active material is monitored by cleaning the active material with a pH buffer solution and then analyzing the pH buffer solution by ICP emission spectroscopic analysis.

A third invention of the present application relates to a method of monitoring the quality of an active material for a lithium secondary battery, including a lithium transition metal oxyanion compound, wherein the active material is cleaned with a pH buffer solution, and the resulting active material is analyzed by X-ray diffraction.

A fourth invention of the present application relates to a method of monitoring the quality of an active material for a lithium secondary battery, including a lithium transition metal oxyanion compound, wherein the active material is cleaned with a pH buffer solution and dried, the resulting active material is further cleaned with the pH buffer solution, and the pH buffer solution after this cleaning is analyzed by ICP emission spectroscopic analysis.

A fifth invention of the present application relates to a method of monitoring the quality of an active material for a lithium secondary battery, including a lithium transition metal oxyanion compound, wherein the active material is cleaned with a pH buffer solution, the resulting active material is cleaned with pure water, and the pure water after this cleaning is analyzed by a pH analysis.

By employing the methods of the second through the fifth inventions of the present application, the amounts of impurities can be quantified/analyzed with high sensitivity and high precision. Therefore, a substance causing the reduction in the capacity can be assessed up to a low concentration and can be analyzed accurately. When using these, it is possible to monitor variations in the amounts of impurities from production lot to production lot and provide a high-quality active material for a lithium secondary battery.

In accordance with the first invention of the present application, by cleaning an active material for a lithium secondary battery, including a lithium transition metal oxyanion compound, with the pH buffer solution, the impurities in the active material can be removed efficiently.

In accordance with the second through the fifth inventions of the present application, by quantifying the amounts of impurities with high sensitivity and high precision, variations in the amounts of impurities can be monitored from production lot to production lot and a high-quality active material for a lithium secondary battery can be provided.

DETAILED DESCRIPTION OF THE PREFERRED EMBODIMENT

Hereinafter, the best embodiment for carrying out the present invention will be described. The present invention is not limited to the following examples, and variations may be appropriately made without changing the content of the present invention.

Embodiment

EXAMPLE 1

<Preparation of Cleaning Solution>
A pH standard solution of a phthalic salt (pH 4.01) produced by KISHIDA CHEMICAL Co., Ltd. was used as a cleaning solution. The cleaning solution at this time was at pH 4.0.
<Cleaning of Sample>
100 mg of a LiFePO$_4$ sample (sample A) including Li$_3$PO$_4$ was weighed out and 10 ml of the cleaning solution was added to this sample, and the resulting mixture was cleaned for 1 hour by ultrasonic treatment in an ultrasonic pretreating apparatus.
<Quantification of Dissolved P>
The cleaning solution after the above cleaning was filtrated with a filter in order to remove the sample not dissolved by cleaning, and an amount of P dissolved in the cleaning solution was quantified by Inductively Coupled high frequency Plasma emission spectroscopic analysis (ICP emission spectroscopic analysis).

The amount of P dissolved was calculated by the following equation.

Amount of P dissolved (% by weight)=(amount of P dissolved in a cleaning solution (mg)×100)/ amount of sample (mg)

In order to identify a pH value of the cleaning solution after cleaning, the pH value of the cleaning solution was also measured.

EXAMPLE 2

Acetic acid and sodium acetate were mixed in a ratio of 1:1 by weight and pure water was added to the resulting mixture to prepare a 1.0% by weight aqueous solution of this mixture, and this aqueous solution was used as a cleaning solution. The cleaning solution at this time was at pH 4.5. A sample was cleaned, the amount of P dissolved in the cleaning solution was quantified, and a pH value of the cleaning solution was measured by the same procedure as in Example 1 except for using this cleaning solution.

EXAMPLE 3

Acetic acid and sodium acetate were mixed in a ratio of 1:10 by weight and pure water was added to the resulting mixture to prepare a 1.0% by weight aqueous solution of this mixture, and this aqueous solution was used as a cleaning solution. The cleaning solution at this time was at pH 5.6. A sample was cleaned, the amount of P dissolved in the cleaning solution was quantified, and a pH value of the cleaning solution was measured by the same procedure as in Example 1 except for using this cleaning solution.

EXAMPLE 4

A 1.0% by weight aqueous solution of $NaHCO_3$ was prepared, and this aqueous solution was used as a cleaning solution. The cleaning solution at this time was at pH 8.5. A sample was cleaned, the amount of P dissolved in the cleaning solution was quantified, and a pH value of the cleaning solution was measured by the same procedure as in Example 1 except for using this cleaning solution.

COMPARATIVE EXAMPLE 1

A sample was cleaned, the amount of P dissolved in the cleaning solution was quantified, and a pH value of the cleaning solution was measured by the same procedure as in Example 1 except for using pure water as a cleaning solution.

The results of the above-mentioned measurements are shown in Table 2. It is understood from Table 2 that, in Examples 1 to 4, the amount of P dissolved in the cleaning solution was more than that in Comparative Example 1 in which pure water is used, and more $Li_3PO_4$ than that in the case of pure water could be removed by cleaning.

In Examples 1 to 4, since the change in pH between the cleaning solution before cleaning and the cleaning solution after cleaning is small, the pH value of the cleaning solution did not change during cleaning, and $LiFePO_4$ was not dissolved.

TABLE 2

|  | pH of Cleaning Solution Before Cleaning | pH of Cleaning Solution After Cleaning | Amount of Dissolved P (wt %) |
| --- | --- | --- | --- |
| Example 1 | 4.0 | 4.6 | 1.01 |
| Example 2 | 4.5 | 4.6 | 1.10 |
| Example 3 | 5.6 | 5.7 | 0.82 |
| Example 4 | 8.5 | 8.8 | 0.91 |
| Comparative Example 1 | 5.6 | 9.4 | 0.74 |

EXAMPLE 5

<Preparation of Cleaning Solution>

Acetic acid and sodium acetate were mixed in a ratio of 1:5 by weight and pure water was added to the resulting mixture to prepare a 5.3% by weight aqueous solution of this mixture, and this aqueous solution was used as a cleaning solution. The cleaning solution at this time was at pH 5.3.

<Cleaning of Sample>

100 mg of a $LiFePO_4$ sample (sample A) including $Li_3PO_4$ was weighed out and 20 ml of the cleaning solution was added to this sample, and the resulting mixture was cleaned for 1 hour by ultrasonic treatment in an ultrasonic pretreating apparatus.

<Quantification of P and Fe Dissolved in Cleaning Solution>

The cleaning solution used in the above cleaning was filtrated with a filter in order to remove the sample not dissolved, and amounts of P and Fe dissolved in the cleaning solution during cleaning were quantified by ICP emission spectroscopic analysis and a pH value of the cleaning solution during cleaning was measured. The amount of P dissolved was calculated by the following equation.

Amount of P dissolved (% by weight)=(amount of P dissolved in a cleaning solution (mg)×100)/ amount of sample (mg)

Amount of Fe dissolved (% by weight)=(amount of Fe dissolved in a cleaning solution (mg)×100)/ amount of sample (mg)

EXAMPLE 6

Acetic acid and sodium acetate were mixed in a ratio of 1:10 by weight and pure water was added to the resulting mixture to prepare a 4.7% by weight aqueous solution of this mixture, and this aqueous solution was used as a cleaning solution. The cleaning solution at this time was at pH 5.6. A sample was cleaned, the amounts of P and Fe dissolved in the cleaning solution were quantified, and a pH value of the cleaning solution was measured by the same procedure as in Example 5 except for using this cleaning solution.

EXAMPLE 7

Acetic acid and sodium acetate were mixed in a ratio of 1:20 by weight and pure water was added to the resulting mixture to prepare a 4.4% by weight aqueous solution of this mixture, and this aqueous solution was used as a cleaning solution. The cleaning solution at this time was at pH 6.0. A sample was cleaned, the amounts of P and Fe dissolved in the cleaning solution were quantified, and a pH value of the cleaning solution was measured by the same procedure as in Example 5 except for using this cleaning solution.

EXAMPLE 8

Acetic acid and sodium acetate were mixed in a ratio of 1:50 by weight and pure water was added to the resulting mixture to prepare a 4.2% by weight aqueous solution of this mixture, and this aqueous solution was used as a cleaning solution. The cleaning solution at this time was at pH 6.3. A sample was cleaned, the amounts of P and Fe dissolved in the cleaning solution were quantified, and a pH value of the cleaning solution was measured by the same procedure as in Example 5 except for using this cleaning solution.

EXAMPLE 9

Acetic acid and sodium acetate were mixed in a ratio of 1:100 by weight and pure water was added to the resulting mixture to prepare a 4.2% by weight aqueous solution of this mixture, and this aqueous solution was used as a cleaning solution. The cleaning solution at this time was at pH 6.8. A sample was cleaned, the amounts of P and Fe dissolved in the cleaning solution were quantified, and a pH value of the cleaning solution was measured by the same procedure as in Example 5 except for using this cleaning solution.

EXAMPLE 10

Acetic acid and sodium acetate were mixed in a ratio of 1:200 by weight and pure water was added to the resulting mixture to prepare a 5.0% by weight aqueous solution of this mixture, and this aqueous solution was used as a cleaning solution. The cleaning solution at this time was at pH 6.9. A sample was cleaned, the amounts of P and Fe dissolved in the cleaning solution were quantified, and a pH value of the cleaning solution was measured by the same procedure as in Example 5 except for using this cleaning solution and changing an amount of the sample A to 50 mg.

EXAMPLE 11

Acetic acid and sodium acetate were mixed in a ratio of 1:500 by weight and pure water was added to the resulting mixture to prepare a 5.0% by weight aqueous solution of this mixture, and this aqueous solution was used as a cleaning solution. The cleaning solution at this time was at pH 7.3. A sample was cleaned, the amounts of P and Fe dissolved in the cleaning solution were quantified, and a pH value of the cleaning solution was measured by the same procedure as in Example 5 except for using this cleaning solution and changing an amount of the sample A to 50 mg.

EXAMPLE 12

Acetic acid and sodium acetate were mixed in a ratio of 1:1000 by weight and pure water was added to the resulting mixture to prepare a 5.2% by weight aqueous solution of this mixture, and this aqueous solution was used as a cleaning solution. The cleaning solution at this time was at pH 7.6. A sample was cleaned, the amounts of P and Fe dissolved in the cleaning solution were quantified, and a pH value of the cleaning solution was measured by the same procedure as in Example 5 except for using this cleaning solution and changing an amount of the sample A to 50 mg.

EXAMPLE 13

Acetic acid and sodium acetate were mixed in a ratio of 1:2000 by weight and pure water was added to the resulting mixture to prepare a 5.2% by weight aqueous solution of this mixture, and this aqueous solution was used as a cleaning solution. The cleaning solution at this time was at pH 7.8. A sample was cleaned, the amounts of P and Fe dissolved in the cleaning solution were quantified, and a pH value of the cleaning solution was measured by the same procedure as in Example 5 except for using this cleaning solution and changing an amount of the sample A to 50 mg.

EXAMPLE 14

Acetic acid and sodium acetate were mixed in a ratio of 1:5000 by weight and pure water was added to the resulting mixture to prepare a 5.2% by weight aqueous solution of this mixture, and this aqueous solution was used as a cleaning solution. The cleaning solution at this time was at pH 8.1. A sample was cleaned, the amounts of P and Fe dissolved in the cleaning solution were quantified, and a pH value of the cleaning solution was measured by the same procedure as in Example 5 except for using this cleaning solution and changing an amount of the sample A to 50 mg.

EXAMPLE 15

A 5.2% by weight aqueous solution of sodium acetate was prepared, and to this, a NaOH solution was added in such a way that a content of NaOH is 0.002% by weight to prepare a cleaning solution. The cleaning solution at this time was at pH 10.6. A sample was cleaned, the amounts of P and Fe dissolved in the cleaning solution were quantified, and a pH value of the cleaning solution was measured by the same procedure as in Example 5 except for using this cleaning solution and changing an amount of the sample A to 50 mg.

EXAMPLE 16

A 5.2% by weight aqueous solution of sodium acetate was prepared, and to this, a NaOH solution was added in such a way that a content of NaOH is 0.005% by weight to prepare a cleaning solution. The cleaning solution at this time was at pH 11.3. A sample was cleaned, the amounts of P and Fe dissolved in the cleaning solution were quantified, and a pH value of the cleaning solution was measured by the same procedure as in Example 5 except for using this cleaning solution and changing an amount of the sample A to 50 mg.

EXAMPLE 17

A 5.2% by weight aqueous solution of sodium acetate was prepared, and to this, a NaOH solution was added in such a way that a content of NaOH is 0.025% by weight to prepare a cleaning solution. The cleaning solution at this time was at pH 12.1. A sample was cleaned, the amounts of P and Fe dissolved in the cleaning solution were quantified, and a pH value of the cleaning solution was measured by the same procedure as in Example 5 except for using this cleaning solution and changing an amount of the sample A to 50 mg.

The results of measurements are shown in Table 3.

<Quantification of Li Dissolved in Cleaning Solution>

With respect to Example 12, Example 14, Example 15, Example 16 and Example 17, an amount of Li dissolved in the cleaning solution were quantified by ICP emission spectroscopic analysis and a ratio between Li and P dissolved in the cleaning solution was determined by the following equation.

Ratio between Li and P (by mole)=(amount (moles) of Li dissolved in a cleaning solution)/(amount (moles) of P dissolved in a cleaning solution)

The results of measurements are shown in Table 4.

TABLE 3

| | Acetic Acid:Sodium Acetate (wt ratio) | Concentration of Cleaning Solution (wt %) | pH of Cleaning Solution Before Cleaning | pH of Cleaning Solution After Cleaning | Amount of P Dissolved (wt %) | Amount of Fe Dissolved (wt %) |
|---|---|---|---|---|---|---|
| Ex. 5 | 1:5 | 5.3 | 5.3 | 5.3 | 0.91 | 0.031 |
| Ex. 6 | 1:10 | 4.7 | 5.6 | 5.6 | 0.87 | 0.018 |
| Ex. 7 | 1:20 | 4.4 | 5.9 | 6.0 | 0.81 | Less than 0.01 |
| Ex. 8 | 1:50 | 4.2 | 6.3 | 6.4 | 0.87 | Less than 0.01 |
| Ex. 9 | 1:100 | 4.2 | 6.6 | 6.8 | 0.88 | Less than 0.01 |

TABLE 3-continued

| | Acetic Acid:Sodium Acetate (wt ratio) | Concentration of Cleaning Solution (wt %) | pH of Cleaning Solution Before Cleaning | pH of Cleaning Solution After Cleaning | Amount of P Dissolved (wt %) | Amount of Fe Dissolved (wt %) |
|---|---|---|---|---|---|---|
| Ex. 10 | 1:200 | 5.0 | 6.9 | 7.1 | 0.88 | Less than 0.005 |
| Ex. 11 | 1:500 | 5.0 | 7.3 | 7.7 | 0.92 | Less than 0.005 |
| Ex. 12 | 1:1000 | 5.2 | 7.6 | 8.2 | 0.79 | Less than 0.005 |
| Ex. 13 | 1:2000 | 5.2 | 7.8 | 8.6 | 0.78 | Less than 0.005 |
| Ex. 14 | 1:5000 | 5.2 | 8.1 | 8.8 | 0.87 | Less than 0.005 |
| Ex. 15 | | 5.2 | 10.6 | 10.3 | 1.00 | Less than 0.005 |
| Ex. 16 | | 5.2 | 11.3 | 11.0 | 1.30 | Less than 0.005 |
| Ex. 17 | | 5.2 | 12.1 | 11.9 | 2.10 | Less than 0.005 |

TABLE 4

| | Acetic Acid:Sodium Acetate (weight ratio) | pH of Cleaning Solution Before Cleaning | Ratio Between Li and P |
|---|---|---|---|
| Example 12 | 1:1000 | 7.6 | 3.0 |
| Example 14 | 1:5000 | 8.1 | 3.0 |
| Example 15 | | 10.6 | 2.5 |
| Example 16 | | 11.3 | 2.1 |
| Example 17 | | 12.1 | 1.6 |

As shown in Table 3, it is found that, by cleaning LiFePO$_4$ by using a pH buffer solution in accordance with the present invention, Li$_3$PO$_4$ can be removed efficiently. As shown in Table 4, in Examples 15 to 17, the ratio between Li and P is smaller than 3. This is considered that LiFePO4 being an active material was dissolved in addition to Li$_3$PO$_4$ being an impurities. The amounts of Fe dissolved of Examples 15 to 17 shown in Table 3 are small, but this is considered that since the pH value of each pH buffer solution in Examples 15 to 17 is alkaline, Fe eluted from the active material is precipitated again out of the solution as hydroxide such as Fe(OH)$_2$ or the like and therefore this Fe was not observed as the amounts of Fe dissolved.

Accordingly, it is found that, by using a pH buffer solution being in a range from pH 5.3 to pH 8.1 as a cleaning solution, the dissolution of Fe from LiFePO$_4$ can be further inhibited and simultaneously Li$_3$PO$_4$ can be removed efficiently.

In Examples 7 to 14, the amounts of Fe dissolved in the cleaning solution become less than those in Examples 5 and 6. Therefore, it is found that by setting the pH at 5.9 or more, the dissolution of Fe can be further inhibited.

Further, in Examples 7 to 10, the changes in pH between the cleaning solution before cleaning and the cleaning solution after cleaning become smaller than those in Examples 11 to 14. Therefore, it is found that, by using a pH buffer solution being in a range from pH 5.9 to pH 6.9 as a cleaning solution, it is not necessary to frequently adjust the pH value of the cleaning solution during cleaning even when cleaning a large amount of the active material. Accordingly, it is found that, by using a pH buffer solution being in a range from pH 5.9 to pH 6.9 as a cleaning solution, the dissolution of Fe can be further inhibited and an impurities of Li$_3$PO$_4$ can be removed efficiently, and since a pH value of the cleaning solution does not change by a large amount when impurities dissolve in the cleaning solution, it is not necessary to frequently adjust the pH value of the cleaning solution and the active material can be cleaned efficiently.

EXAMPLE 18

A sample was cleaned by the same procedure as in Example 13 except for using 50 mg of LiFe$_{0.97}$Mn$_{0.03}$PO$_4$ sample (sample B) including Li$_3$PO$_4$. Amounts of Fe and Mn dissolved in the cleaning solution were quantified by ICP emission spectroscopic analysis.

<Quantification of Amounts of Dissolved Fe and Mn>

The amounts of dissolved Fe and Mn were calculated by the following equation.

Amount of Fe dissolved (% by weight)=(amount of Fe dissolved in a cleaning solution (mg)×100)/ amount of sample (mg)

Amount of Mn dissolved (% by weight)=(amount of Mn dissolved in a cleaning solution (mg)×100)/ amount of sample (mg)

EXAMPLE 19

A sample was cleaned by the same procedure as in Example 18 except for using 50 mg of LiFe$_{0.90}$Mn$_{0.10}$PO$_4$ sample (sample C) including Li$_3$PO$_4$. Amounts of Fe and Mn dissolved in the cleaning solution were quantified by the same manner as in Example 18.

The results of measurements are shown in Table 5.

TABLE 5

| | | Amount of Fe Dissolved (wt %) | Amount of Mn Dissolved (wt %) |
|---|---|---|---|
| Example 13 | Sample A (LiFePO$_4$) | Less than 0.005 | — |
| Example 18 | Sample B (LiFe$_{0.97}$Mn$_{0.03}$PO$_4$) | Less than 0.005 | Less than 0.005 |
| Example 19 | Sample C (LiFe$_{0.90}$Mn$_{0.10}$PO$_4$) | Less than 0.005 | Less than 0.005 |

As shown in Table 5, it is found that Fe and Mn are not eluted into a pH buffer solution even when cleaning LiFe$_{1-x}$Mn$_x$PO$_4$ (0≦x≦1.0) with the pH buffer solution. Accordingly, it is found that, by cleaning LiMPO$_4$ which is olivine type lithium phosphate by using a pH buffer solution, impurities can be removed with little dissolution of an active material.

EXAMPLE 20

<Cleaning of Sample>

200 ml of the buffer solution used in Example 8 was added to 6 g of the LiFePO$_4$ sample (sample A) including Li$_3$PO$_4$, and the resulting mixture was stirred for 5 minutes with a magnetic stirrer and filtrated with a filter to recover the sample. Furthermore, this operation was repeated two more times. Thereafter, 200 ml of pure water was added to the sample, and the resulting mixture was filtrated with a filter, and the resulting powder was dried to recover an active material.

<X-Ray Diffraction Measurement>

The cleaned sample obtained by cleaning of a sample was used and this sample was measured by X-ray diffraction. As an X-ray diffraction apparatus, RINT 2200 (manufactured by RIGAKU Corporation) was employed. Setting a diffraction angle within a range of $20° \leq 2\theta \leq 25°$, an X-ray diffraction pattern was measured at a scanning speed of 0.1°/min. In measurement, a tube bulb (CuKα line) in which a target is copper and a monochrometor were used.

<Charge-Discharge Test>

Figure 1:
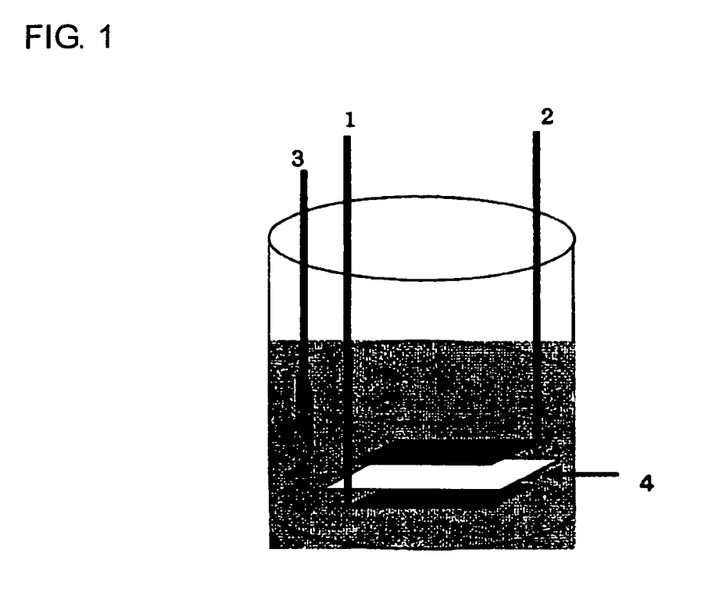
FIG. 1 is a schematic diagram of a charge-discharge test apparatus used in Examples and Comparative Examples of the present invention.

The cleaned sample obtained by cleaning of a sample was used as an active material, and the following charge-discharge test was performed. An active material, a conductive material and a binder were mixed so as to be a ratio of 90:5:5 by weight, and a proper amount of N-methyl-2-pyrolidone was added to this to prepare a slurry. This slurry was applied onto aluminum foil by a doctor blade method and dried at 80° C. by using a hot plate. The aluminum foil coated with slurry was cut off into a size of 2 cm×2 cm. The cut off aluminum foil was rolled out with a pressure roller and dried at 100° C. in a vacuum to be used as a positive electrode. In an inert atmosphere, the above-mentioned positive electrode was used for a working electrode, and lithium metal was used for a negative electrode being an opposite electrode and a reference electrode. To these electrodes, a solution, which was prepared by dissolving 1 mol/liter of LiPF$_6$ in a mixed solvent formed by mixing ethylene carbonate (EC) and diethyl carbonate (DEC) in a ratio of 3:7 by volume, was added to prepare a test cell shown in FIG. 1. Using this test cell, a charge-discharge test (charge: 0.2 It-4.2 V, discharge: 0.1 It-2.0 V) was performed.

<Monitoring of Impurities Amount by pH Buffer Solution>

Using the cleaned sample obtained by cleaning of a sample, this sample was further cleaned with a pH buffer solution similar to that of Example 8, and an amount of Li dissolved in the buffer solution was quantified by ICP emission spectroscopic analysis.

<Monitoring of Impurities by pH Measurement>

0.2 g of the cleaned sample obtained by cleaning of a sample was weighed, and to this, 200 ml of pure water was added, and the resulting mixture was stirred for 60 minutes with a magnetic stirrer in a nitrogen atmosphere to further clean the sample. Thereafter, a pH value of the pure water after this cleaning was measured.

COMPARATIVE EXAMPLE 2

X-ray diffraction measurement, a charge-discharge test, monitoring of an impurities amount by a pH buffer solution, and monitoring of impurities by pH measurement were conducted by the same procedure as in Example 20 except for using pure water instead of a pH buffer solution as a cleaning solution used for cleaning a sample.

COMPARATIVE EXAMPLE 3

X-ray diffraction measurement, a charge-discharge test, monitoring of an impurities amount by a pH buffer solution, and monitoring of impurities by pH measurement were conducted by the same procedure as in Example 20 except for not cleaning a sample.

Figure 2:
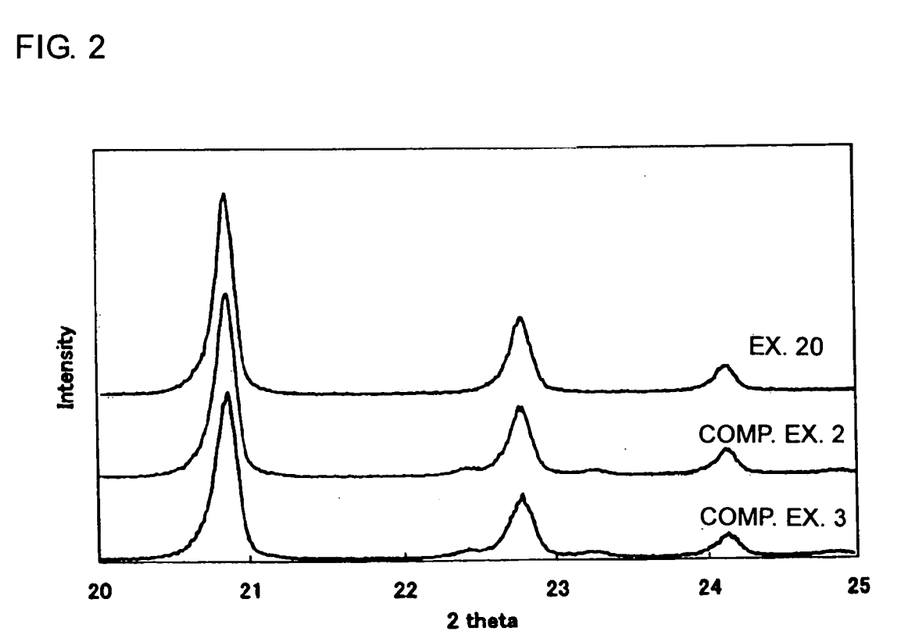
FIG. 2 is an X-ray diffraction pattern of an active material used in Examples and Comparative Examples of the present invention.
Figure 3:
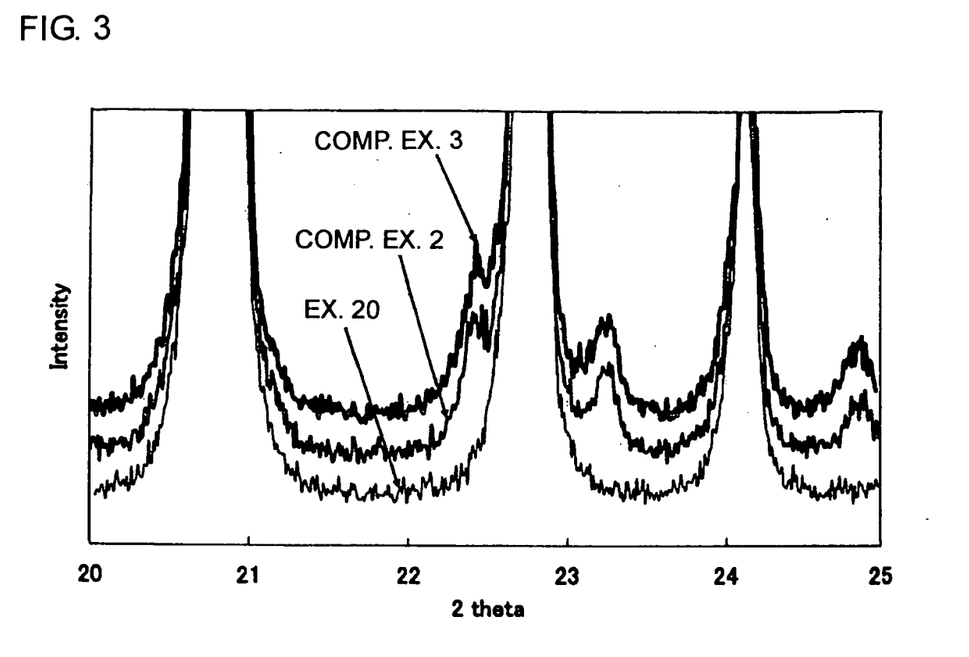
FIG. 3 is an enlarged view of FIG. 2.

The results of the above-mentioned X-ray diffraction measurement are shown in FIG. 2 and an enlarged view of FIG. 2 is shown in FIG. 3. From FIGS. 2 and 3, it is found that peaks around 20.8°, 22.8°, and 24.1° belonging to LiFePO$_4$ (JCPDS 401499) having an olivine structure did not change in cleaning with pure water in Comparative Example 2 and in cleaning with the pH buffer solution in Example 20. From this fact, it could be confirmed that the structure of LiFePO$_4$ does not collapse by cleaning. And, it was confirmed that Li$_3$PO$_4$ can be removed by cleaning in which a pH buffer solution was used as a cleaning solution from the fact that, in Example 20, peaks around 22.4°, 23.3°, and 24.9° belonging to Li$_3$PO$_4$ (JCPDS 150760) become unobservable.

The results of the above-mentioned charge-discharge test are shown in Table 6. It is found from Table 6 that a larger discharge capacity could be attained in Example 20 in which the sample was cleaned with the cleaning solution being at pH 6.3 compared with Comparative Example 2 in which the sample was cleaned with pure water or Comparative Example 3 in which the sample was not cleaned. And, in Example 20, the amounts of P and Li dissolved in the cleaning solution were more than those in Comparative Example 2 in which the sample was cleaned with pure water. From these results, it could be confirmed that, by cleaning with a pH buffer solution, Li$_3$PO$_4$ can be removed efficiently and a high discharge capacity can be attained.

The cleaned sample obtained by first cleaning of a sample was further cleaned with a pH buffer solution or pure water, and in Table 6 are shown the results of an amount of Li dissolved in the buffer solution or a pH value of the buffer solution used in cleaning. It is found that the cleaned samples of Comparative Examples 2 and 3 contain more impurities than that of Examples 20 from the fact that the amounts of dissolved Li in Comparative Examples 2 and 3 are more than that of Example 20.

TABLE 6

|  | Cleaning of Sample (first) | Amount of P Dissolved (wt %) | Amount of Li Dissolved (wt %) | Discharge Capacity per Active Material at 0.1 It (mAh/g) | Amount of Li Dissolved in a pH Buffer Solution Used in Cleaning When Further Cleaning the Cleaned Sample with a pH Buffer Solution (wt %) | pH When Cleaning the Cleaned Sample with Pure Water |
|---|---|---|---|---|---|---|
| Ex. 10 | Cleaned with pH Buffer Solution | 1.0 | 0.7 | 154.1 | 0.20 | 8.9 |

TABLE 6-continued

| | Cleaning of Sample (first) | Amount of P Dissolved (wt %) | Amount of Li Dissolved (wt %) | Discharge Capacity per Active Material at 0.1 lt (mAh/g) | Amount of Li Dissolved in a pH Buffer Solution Used in Cleaning When Further Cleaning the Cleaned Sample with a pH Buffer Solution (wt %) | pH When Cleaning the Cleaned Sample with Pure Water |
|---|---|---|---|---|---|---|
| Comp. Ex. 2 | Cleaned with Pure Water | 0.3 | 0.1 | 152.4 | 0.62 | 10.2 |
| Comp. Ex. 3 | Not Cleaned | — | — | 151.8 | 0.83 | 10.3 |

EXAMPLES 21 TO 28

Each of LiFePO$_4$ samples (samples B1 to B8: Amounts of Li$_3$PO$_4$ contained in the samples B1 to B8 are different) including Li$_3$PO$_4$ was cleaned with a pH buffer solution similar to that of Example 8, and an amount of Li dissolved in the buffer solution was quantified by ICP emission spectroscopic analysis of the buffer solution after this cleaning. The results of analysis are shown in Table 7.

TABLE 7

| | Used Sample | Amount of Li Dissolved in Buffer Solution (wt %) |
|---|---|---|
| Example 21 | B1 | 0.83 |
| Example 22 | B2 | 0.33 |
| Example 23 | B3 | 0.38 |
| Example 24 | B4 | 0.45 |
| Example 25 | B5 | 0.68 |
| Example 26 | B6 | 0.72 |
| Example 27 | B7 | 0.47 |
| Example 28 | B8 | 0.55 |

REFERENCE EXPERIMENTS 1 TO 8

0.2 g of each of samples B1 to B8 used in the above-mentioned Examples 21 to 28 was weighed, and to this, 200 ml of pure water was added, and the resulting mixture was stirred for 60 minutes with a magnetic stirrer in a nitrogen atmosphere to clean each sample. Thereafter, a pH value of the pure water after this cleaning was measured. The results of measurements are shown in Table 8. Further, the Li amounts dissolved in a buffer solution shown in Table 7 are also shown together in Table 8.

TABLE 8

| | Used Sample | Amount of Li Dissolved in Buffer Solution (wt %) | pH of the Pure Water Used in Pure Water Cleaning |
|---|---|---|---|
| Reference Experiment 1 | B1 | 0.83 | 10.3 |
| Reference Experiment 2 | B2 | 0.33 | 9.5 |
| Reference Experiment 3 | B3 | 0.38 | 9.3 |
| Reference Experiment 4 | B4 | 0.45 | 9.7 |
| Reference Experiment 5 | B5 | 0.68 | 10.1 |
| Reference Experiment 6 | B6 | 0.72 | 10.2 |
| Reference Experiment 7 | B7 | 0.47 | 9.7 |
| Reference Experiment 8 | B8 | 0.55 | 9.9 |

Figure 4:
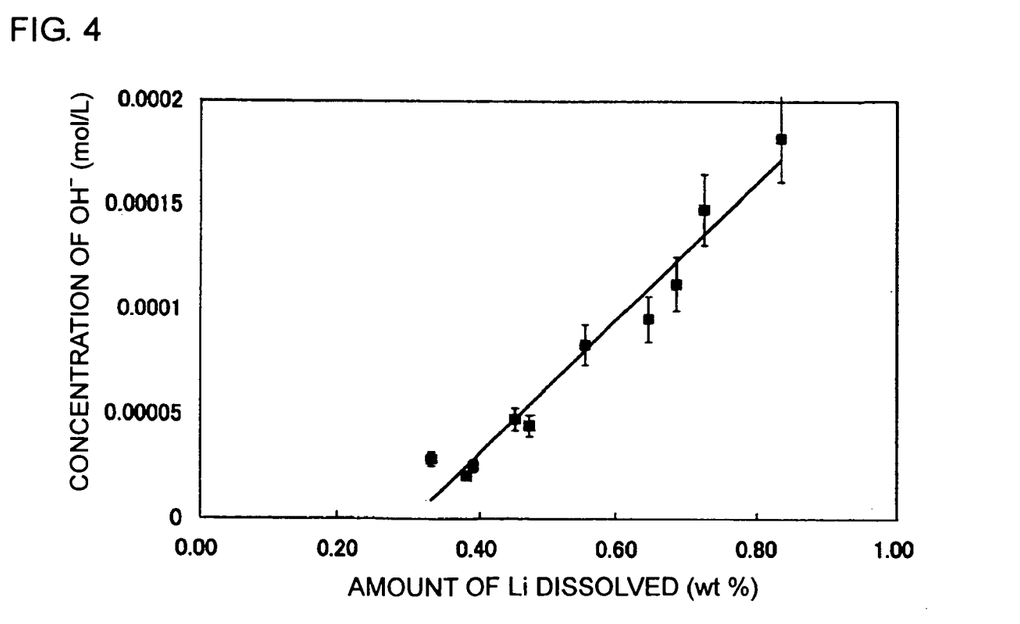
FIG. 4 is a graph showing a relationship between an OH$^-$ concentration derived from a pH value of pure water used in cleaning the active material with pure water and an amount of Li dissolved in a pH buffer solution in cleaning the active material with the pH buffer solution.

A graph, which is obtained by plotting the amount of Li dissolved in a buffer solution shown in Table 8 on a horizontal axis and an OH concentration derived from the pH value of the pure water used in pure water cleaning shown in Table 8 on a vertical axis, is shown in FIG. 4. As shown in FIG. 4, it is found that the amount of Li dissolved is linearly proportional to the OH concentration derived from the pH value. Therefore, it was confirmed that, by measuring a pH value of pure water used in cleaning the active material with pure water, the amounts of impurities could be more easily quantified with high sensitivity and high precision. Accordingly, it is found that, in accordance with the present invention, by cleaning, with pure water, the active material cleaned with the pH buffer solution, and analyzing a pH value of pure water used in cleaning with pure water, the amounts of impurities contained in the active material after cleaning with the pH buffer solution can be quantified.

REFERENCE EXPERIMENTS 9 TO 15

Since LiFePO$_4$ is a compound including Fe, a raw material or a Fe compound as a by-product upon synthesizing may be contained in LiFePO$_4$ as impurities after the synthesis of LiFePO$_4$. The Fe compound as impurities other than LiFePO$_4$ is estimated to result in the reduction in the charge-discharge capacity. Further, it is considered that there arise a voltage depression resulting from the fact that a Fe compound as impurities in a positive electrode is dissolved and moves to a negative electrode in a battery, and a reduction in charge-discharge efficiency or a voltage depression due to the deposition of Li. Therefore, it is preferable to eliminate the Fe compound as impurities. And so, in order to check if the Fe compound as impurities is removed by the present invention, the following Reference Experiments were performed. 10 mg of a Fe compound shown in Table 9 was dissolved in 20 ml of a pH buffer solution similar to that of Example 8, and 2 ml of the resulting solution was diluted with 100-fold of the pH buffer solution, and an amount of Fe was quantified by analyzing this diluted solution by ICP emission spectroscopic analysis.

TABLE 9

| | Fe Compound | Amount of Extracted Fe (wt %) | Valence of Fe |
|---|---|---|---|
| Example 8 | LiFePO$_4$ | Less than 0.005 | 2 |
| Reference Experiment 9 | FeSO$_4$ | 5.86 | 2 |
| Reference Experiment 10 | FeO | 0.31 | 2 |
| Reference Experiment 11 | Fe$_3$(PO$_4$)$_2$ | 0.21 | 2 |
| Reference Experiment 12 | Fe$_3$O$_4$ | Less than 0.03 | 2.7 |
| Reference Experiment 13 | FePO$_4$ | Less than 0.03 | 3 |
| Reference Experiment 14 | Fe$_2$O$_3$ | Less than 0.03 | 3 |
| Reference Experiment 15 | FeOOH | Less than 0.03 | 3 |

From Table 9, it is found that it is possible to extract FeSO$_4$, FeO or Fe$_3$(PO$_4$)$_2$, in which the valence of Fe is bivalent, other than LiFePO$_4$ without dissolving LiFePO$_4$ with a buffer solution.

EXAMPLES 29 TO 36

As with Example 8, the samples B1 to B8 were used, and each sample was cleaned with a pH buffer solution, and an amount of Fe dissolved in the pH buffer solution was quantified by ICP emission spectroscopic analysis of the buffer solution after this cleaning. The results of analysis are shown in Table 10. From Table 10, it is found that not only Li$_3$PO$_4$ but also Fe can be extracted as an impurities other than LiFePO$_4$ by the pH buffer solution. It is considered that thereby, it becomes possible to inhibit the occurrences of a reduction in charge-discharge capacity, a voltage depression resulting from the fact that a Fe compound as an impurities in a positive electrode is dissolved and moves to a negative electrode in a battery, and a reduction in charge-discharge efficiency or a voltage depression due to the deposition of Li.

TABLE 10

| | Sample | Amount of Extracted Fe (wt %) |
|---|---|---|
| Example 29 | B1 | 0.003 |
| Example 30 | B2 | 0.01 |
| Example 31 | B3 | 0.18 |
| Example 32 | B4 | 0.17 |
| Example 33 | B5 | 0.08 |
| Example 34 | B6 | 0.07 |
| Example 35 | B7 | 0.23 |
| Example 36 | B8 | 0.16 |

REFERENCE EXPERIMENT 16

Charge-discharge characteristic of a nonaqueous electrolyte secondary battery, in which LiFePO$_4$, used in Example 30, was not cleaned with a buffer solution and was used as a positive active material, was evaluated.

[Preparation of Positive Electrode]

N-methyl-2-pyrrolidone was added to a mixture formed by mixing LiFePO$_4$ being a positive active material, acetylene black being a conductive material, and polyvinylidene fluoride being a binder so as to be a ratio of 85:10:5 by weight to prepare a slurry of the mixture, and this slurry was applied onto both sides of a positive electrode collector composed of aluminum foil, and dried to prepare a positive electrode.

[Preparation of Negative Electrode]

Water was added to a mixture formed by mixing graphite and a binder so as to be a ratio of 98:2 by weight to prepare a slurry of the mixture, and this slurry was applied onto both sides of a collector composed of copper foil, and dried to prepare a positive electrode. The above-mentioned positive electrode and negative electrode are designed in such a way that a capacity of the negative electrode per a unit area is 1.1 times of a capacity of the positive electrode per a unit area.

[Preparation of Battery]

The obtained positive electrode and negative electrode were rolled out with a pressure roller. After being rolled out, the positive electrode was cut into a piece of 55 mm in width and 750 mm in length, and the negative electrode was cut into a piece of 58 mm in width and 850 mm in length, and a positive electrode lead was attached to the positive electrode and a negative electrode lead was attached to the negative electrode.

Figure 5:
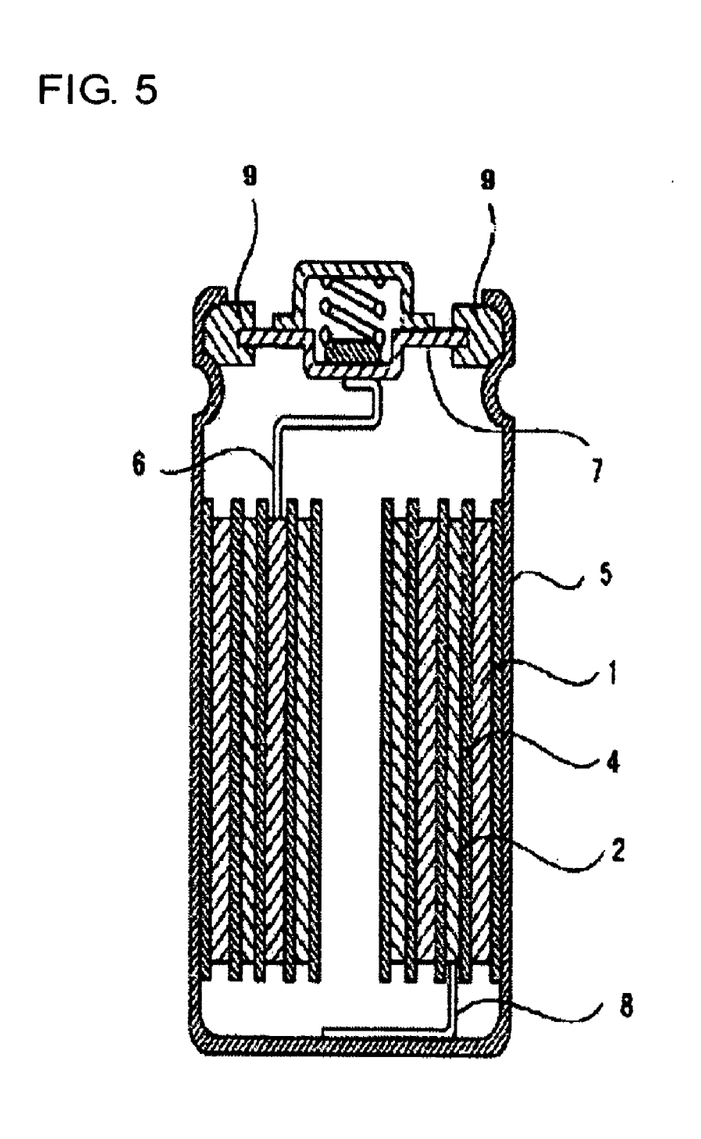
FIG. 5 is a sectional explanatory view showing an internal structure of a nonaqueous electrolyte battery prepared in Reference Experiments 16 and 17.

As shown in FIG. 5, a battery was prepared by using the positive electrode 1 and the negative electrode 2, prepared as described above, and a separator 4 made of micro-porous polypropylene. The negative electrode 2, the separator 4, the positive electrode 1, and the separator 4 were laminated one after another in this order, and the laminated substance was rolled more than once in a spiral fashion to prepare a battery device. An insulating plate was attached to the top face and the bottom face, respectively, of the battery device, and the battery device was housed in the battery can 5, and the positive electrode lead 6 was welded to the cover 7 and the negative electrode lead 8 was welded to the battery can 5.

Ethylene carbonate (EC) and ethyl methyl carbonate (EMC) were mixed so as to be a ratio of 3:7 by volume, and LiPF$_6$ was dissolved in the resulting mixed solvent so as to be 1 mol/liter in concentration, and then vinylene carbonate was mixed in the resulting solution in an amount 2% by weight to form an electrolyte solution. This electrolyte solution was poured in a battery can in such a way that the positive electrode, the separator, and the negative electrode were wetted in the electrolyte solution. Thereafter, a cover 7 was crimped onto the battery can 5 through a gasket 9 therebetween to seal the battery to fabricate a cylindrical battery of 18 mm in diameter and 65 mm in height.

REFERENCE EXPERIMENT 17

A battery was prepared by the same procedure as in Reference Experiment 16 except for using LiFePO$_4$ used in Example 33 as a positive active material without cleaning LiFePO$_4$ with a buffer solution.

<Charge-Discharge Test>

A charge-discharge test was performed on each of the batteries of Reference Experiments 16 and 17. Each battery was charged to 3.8 V at a constant current (1000 mA) at room temperature, and then was charged at a constant voltage until a current reached 50 mA. Thereafter, the battery was discharged to 2.0 V at a constant current (1000 mA). These results are shown in Table 11. Further, initial charge-discharge efficiency was determined by the following equation.

Initial charge-discharge efficiency (%)=(discharge capacity)×100/(charge capacity)

TABLE 11

| | Initial Charge-Discharge Efficiency (%) |
|---|---|
| Reference Experiment 16 | 89.3 |
| Reference Experiment 17 | 88.7 |

From Table 11, it is found that, in Reference Experiment 16 in which an amount of extracted Fe is 0.01% by weight (Example 30) in the case of extracting with the buffer solution, initial charge-discharge efficiency is higher than that in Reference Experiment 17 in which an amount of extracted Fe is 0.08% by weight (Example 33).

[Charge Retention Test]

A charge retention test was performed on each of the batteries of Reference Experiments 16 and 17. Each battery was charged to 3.8 V at a constant current (1000 mA) at room temperature, and then was charged at a constant voltage until a current reached 50 mA. Thereafter, the battery was discharged to 2.0 V at a constant current (1000 mA), and this was considered as a discharge capacity before retention. Each battery was charged to 3.8 V at a constant current (1000 mA) at room temperature, and then was charged at a constant voltage until a current reached 50 mA. The charged battery was stored at 60° C. for 20 days, and was discharged to 2.0 V at a constant current (1000 mA) at room temperature. Thereafter, each battery was charged to 3.8 V at a constant current (1000 mA) at room temperature, and then was charged at a constant voltage until a current reached 50 mA. Thereafter, the battery was discharged to 2.0 V at a constant current (1000 mA), and this was considered as a discharge capacity after retention. These results are shown in Table 12. Further, a capacity recovery rate was determined by the following equation.

Capacity recovery rate (%)=(discharge capacity after retention)×100/(discharge capacity before retention)

TABLE 12

|  | Capacity Recovery Rate (%) |
| --- | --- |
| Reference Experiment 16 | 91.0 |
| Reference Experiment 17 | 89.5 |

From Table 12, it is found that, in Reference Experiment 16 in which an amount of extracted Fe is 0.01% by weight (Example 30) in the case of extracting with the buffer solution, a capacity recovery rate after the charge retention is larger than that in Reference Experiment 17 in which an amount of extracted Fe is 0.08% by weight (Example 33). From the above-mentioned descriptions, it is said that the less amount of Fe extracted with a buffer solution, the more the initial charge-discharge efficiency or the charge retention characteristic is improved.

From the above-mentioned results, the following facts became apparent. By cleaning an active material including a lithium transition metal oxyanion compound with a pH buffer solution, only impurities in the active material can be removed, and consequently an active material for a lithium secondary battery, having a high energy density, can be provided. Further, it is considered that there can be inhibited the occurrence of a voltage depression resulting from the fact that a Fe compound as an impurities in a positive electrode is dissolved and moves to a negative electrode in a battery, and the occurrence of a reduction in charge-discharge efficiency or a voltage depression due to the deposition of Li. Furthermore, it is considered that, by inhibiting the deposition of Li, charge retention characteristics can be improved.

By cleaning the active material including a lithium transition metal oxyanion compound with the pH buffer solution, and then analyzing the pH buffer solution after this cleaning by ICP emission spectroscopic analysis, quality of the active material can be monitored with high precision.

By cleaning the active material including a lithium transition metal oxyanion compound with the pH buffer solution, and then analyzing the resulting active material by X-ray diffraction, the quality of the active material can be monitored with high precision.

By cleaning the active material including a lithium transition metal oxyanion compound with the pH buffer solution, further cleaning the resulting active material with the pH buffer solution, and then analyzing the pH buffer solution after this cleaning by ICP emission spectroscopic analysis, the quality of the active material can be monitored with high precision.

By cleaning the active material including a lithium transition metal oxyanion compound with the pH buffer solution, further cleaning the resulting active material with pure water, and measuring a pH value of the pure water after this cleaning, the quality of the active material can be monitored with high precision.

What is claimed is:

1. A method of producing an active material for a lithium secondary battery comprising the steps of preparing an active material including a lithium transition metal oxyanion compound, and cleaning said active material with a pH buffer solution.

2. The method of producing an active material for a lithium secondary battery according to claim 1, wherein said lithium transition metal oxyanion compound is $LiMPO_4$ wherein M represents at least one element selected from Co, Ni, Mn, and Fe.

3. The method of producing an active material for a lithium secondary battery according to claim 1, wherein said lithium transition metal oxyanion compound is $LiFePO_4$.

4. The method of producing an active material for a lithium secondary battery according to claim 1, wherein a pH value of said pH buffer solution is in the range from 4.0 to 8.5.

5. The method of producing an active material for a lithium secondary battery according to claim 4, wherein a pH value of said pH buffer solution is in the range from 5.3 to 8.1.

6. The method of producing an active material for a lithium secondary battery according to claim 5, wherein a pH value of said pH buffer solution is in the range from 5.9 to 6.9.

7. The method of producing an active material for a lithium secondary battery according to claim 1, wherein said pH buffer solution is a mixed solution of acetic acid and sodium hydroxide, or a mixed solution of acetic acid and sodium acetate.

8. A method of monitoring a quality of an active material for a lithium secondary battery comprising the steps of;
preparing an active material including a lithium transition metal oxyanion compound;
cleaning said active material with a pH buffer solution;
further cleaning the active material resulting from drying said active material after said cleaning, with pure water; and
analyzing said pure water after said further cleaning by pH analysis.

9. The method of monitoring a quality of an active material for a lithium secondary battery according to claim 8, wherein said lithium transition metal oxyanion compound is $LiMPO_4$ wherein M represents at least one element selected from Co, Ni, Mn, and Fe.

10. The method of monitoring a quality of an active material for a lithium secondary battery according to claim 9, wherein said lithium transition metal oxyanion compound is $LiFePO_4$.

11. A method of monitoring a quality of an active material for a lithium secondary battery comprising the steps of;

preparing an active material including a lithium transition metal oxyanion compound;

cleaning said active material with a pH buffer solution; and analyzing said pH buffer solution after said cleaning by Inductively Coupled high frequency Plasma (ICP) emission spectroscopic analysis.

12. The method of monitoring a quality of an active material for a lithium secondary battery according to claim 11, wherein said lithium transition metal oxyanion compound is $LiMPO_4$ wherein M represents at least one element selected from Co, Ni, Mn, and Fe.

13. The method of monitoring a quality of an active material for a lithium secondary battery according to claim 12, wherein said lithium transition metal oxyanion compound is $LiFePO_4$.

14. A method of monitoring a quality of an active material for a lithium secondary battery comprising the steps of;

preparing an active material including a lithium transition metal oxyanion compound;

cleaning said active material with a pH buffer solution; and analyzing said active material after said cleaning by X-ray diffraction analysis.

15. The method of monitoring a quality of an active material for a lithium secondary battery according to claim 14, wherein said lithium transition metal oxyanion compound is $LiMPO_4$ wherein M represents at least one element selected from Co, Ni, Mn, and Fe.

16. The method of monitoring a quality of an active material for a lithium secondary battery according to claim 15, wherein said lithium transition metal oxyanion compound is $LiFePO_4$.

17. A method of monitoring a quality of an active material for a lithium secondary battery comprising the steps of;

preparing an active material including a lithium transition metal oxyanion compound;

cleaning said active material with a pH buffer solution;

further cleaning the active material resulting from drying said active material after said cleaning, with a pH buffer solution; and analyzing said pH buffer solution after said further cleaning by ICP emission spectroscopic analysis.

18. The method of monitoring a quality of an active material for a lithium secondary battery according to claim 17, wherein said lithium transition metal oxyanion compound is $LiMPO_4$ wherein M represents at least one element selected from Co, Ni, Mn, and Fe.

19. The method of monitoring a quality of an active material for a lithium secondary battery according to claim 18, wherein said lithium transition metal oxyanion compound is $LiFePO_4$.

* * * * *